United States Patent

[11] 3,576,153

| [72] | Inventor | Kingsley A. Doutt |
| | | Alpena, Mich. |
| [21] | Appl. No. | 772,974 |
| [22] | Filed | Nov. 4, 1968 |
| [45] | Patented | Apr. 27, 1971 |
| [73] | Assignee | Scovill Manufacturing Company |
| | | Waterbury, Conn. |

[54] U-CUP SEAL FOR PISTONS
2 Claims, 2 Drawing Figs.

[52] U.S. Cl. ............................................. 92/244, 277/63
[51] Int. Cl. ............................................. F16j 9/08
[50] Field of Search ............................ 277/63, 58, 205; 92/244, 248

[56] References Cited
UNITED STATES PATENTS

| 2,962,330 | 11/1960 | Kohl ............................ | 92/244 |
| 3,189,359 | 6/1965 | Haberkorn ................... | 277/205 |
| 3,334,549 | 8/1967 | Sheldon ....................... | 277/63(X) |
| 3,397,893 | 8/1968 | Kampert ...................... | 92/244(X) |

Primary Examiner—Everette A. Powell, Jr.
Attorney—Webster B. Harpman

ABSTRACT: A U-cup seal for pistons in piston and cylinder assemblies, the seal being formed in a size and shape that is different from that of its environmental use and location. Specifically the as formed seal shape is stretched when installed on a piston to be used in a piston and cylinder assembly and the distortion occuring from such stretching as well as that subsequently occuring when the seal is subjected to fluid pressures in the piston and cylinder assembly reshape the seal to insure a leaktight location maintaining U-cup seal construction.

PATENTED APR 27 1971

3,576,153

INVENTOR.
KINGSLEY A. DOUTT
BY
W.B. Harpman
ATTORNEY

U-CUP SEAL FOR PISTONS

BACKGROUND OF THE INVENTION

1. Field of the Invention

This invention relates to piston seals as used in piston and cylinder assemblies both hydraulic and pneumatic and wherein reciprocal pistons are sealed in moving relation with the inner surfaces of cylinders.

2. Description of the Prior Art

Prior piston seals of the U-cup type have depended upon the U-shape configuration of the annular seals to maintain a sealing relation with the cylinder wall and with the piston on which they are mounted. Devices of this type may be seen in prior U.S. Pat. Nos. 2,962,330 and 3,334,549.

SUMMARY OF THE INVENTION

The piston seal disclosed herein is used in oppositely disposed pairs on a piston in a piston and cylinder assembly and in connection with intermediate plastic bearings which float the piston relative to the cylinder.

The piston seals themselves are of a novel configuration so arranged that they are smaller in their as-formed shape than the area in which they are positioned on the pistons and they are thus distorted by installation, the distortion creating a sealing effect which would not otherwise be possible. In addition, the as-formed shape provides a curved flange for wiping engagement with the cylinder wall which is distorted in the environmental positioning of the piston and seal in the cylinder thereby increasing the natural resiliency of the material of which the piston seal is formed.

DESCRIPTION OF THE PREFERRED EMBODIMENT

Figure 2:
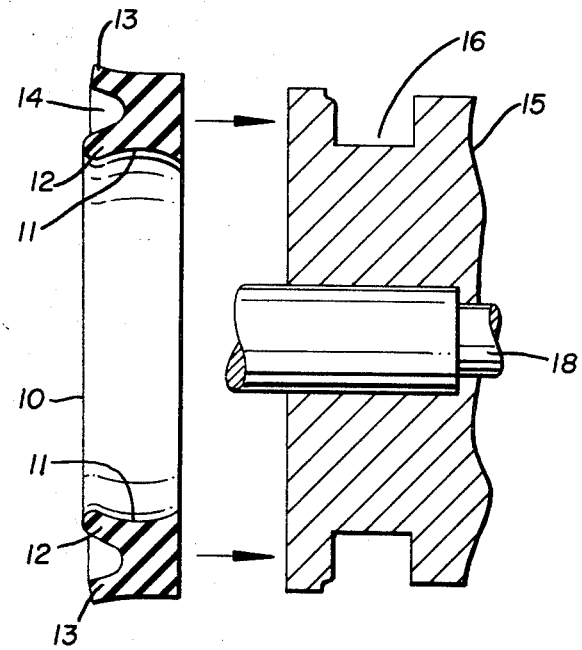
FIG. 2 is a composite view showing a vertical section through one of the piston seals in as-formed shape and a comparable sectional view of a piston and the area thereof in which the seal is installed so that the relatively different sizes of the seal and the installation area may be compared.

The U-cup piston seal disclosed herein is illustrated in FIG. 2 of the drawings in its as-formed shape and by referring thereto it will be seen that it comprises an annular member 10 of resilient material having an arcuate inner surface 11 extending inwardly of the annular member and defining a portion of an annular flange 12 which is of smaller diameter than a secondary flange 13 formed in spaced relation thereto and immediately radially, outwardly thereof.

The area between the flanges 12 and 13 defines an annular groove 14 which extends well into the body of the annular U-cup piston seal and forms the basis of the configuration which makes the device of the invention comparable to the U-cup piston seal of the prior art.

The annular flange 13 is also angularly disposed sidewardly and radially of the piston seal and by still referring to FIG. 2 of the drawings, a vertical section of a piston 15 may be seen with a seal-receiving groove 16 annularly thereof and it will be observed that the smallest diameter of the piston seal 10 is smaller than the smallest diameter of the groove 16 in the piston 15.

It will therefore be obvious that the piston seal 10 must be stretched and thereby distorted in placing it in the groove 16, whether the piston is integral or of multipart construction. When this occurs, the piston seal 10 assumes the configuration seen in FIG. 1 of the drawings and by referring thereto, it will be observed that the arcuate transverse plane of its smallest diameter has flattened out due to the distortion of installation as aforesaid. This results in the annular edge of the flange 12 which is rounded in a configuration resembling half of an O-ring sealingly engaging the adjacent surface of the piston.

Figure 1:
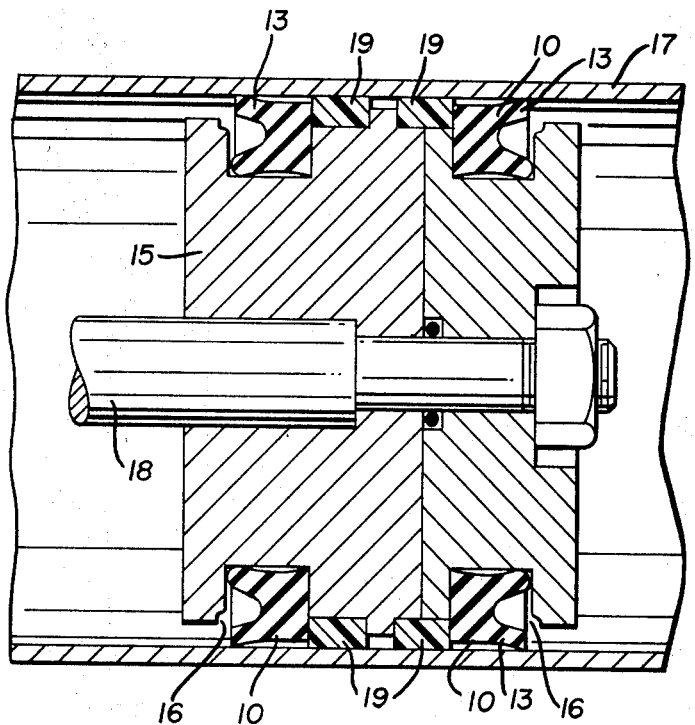
FIG. 1 is a cross-sectional elevation of a piston and cylinder assembly with parts broken away and illustrating the piston seals of the invention installed thereon.

When the piston with the seals mounted thereon, as seen in FIG. 1 of the drawings is installed in a cylinder, the flange 13 which is angularly disposed in its as-formed condition is distorted to a generally flat configuration so that it provides an unusually efficient sealing action with respect to the cylinder 17.

Still referring to FIG. 1 of the drawings, it will be seen that the piston 15 is provided with two of the grooves 16 and two of the piston seals 10 and that the piston seals 10 are mounted in oppositely disposed relation so that the flanges 12 and 13 extend outwardly toward the opposite outer faces of the piston 15. The piston 15 is mounted on a piston rod 18 and the piston and cylinder construction only a portion of which is disclosed herein normally includes the heads closing the ends of the cylinder 17 the gland through which the piston rod 18 passes and the inlet and outlet ports, all of which will be found in conventional piston and cylinder assemblies as known in the art.

The area of the piston 15 between the annular grooves 16 therein provides for the positioning of a pair of annular bearing members 19 each of which backs up and provides direct contact with the back surface of the adjacent piston seal member 10. The bearing members 19 provide the necessary lubrication-receiving floating action of the piston in the cylinder to maintain its axial alignment with the cylinder 17 and the piston seals 10 and specifically the flanges 13 thereof effect the necessary seal as heretofore explained.

Although but one embodiment of the present invention has been illustrated and described it will be apparent to those skilled in the art that various changes and modifications may be made therein without departing from the spirit of the invention or from the scope of the appended claims.

I claim:

1. A U-cup seal for a piston and cylinder assembly comprising an annular ring of resilient material having in cross section four walls, an inner wall, an outer wall and sidewalls, one of the sidewalls being substantially flat, the inner wall being of arcuate shape extending inwardly toward the center of the ring, the junction of the one sidewall and the inner wall being on a point, the other sidewall having an inwardly extending annular groove therein, the junction between the inner wall and the other sidewall being rounded into the configuration of a half O-ring, said rounded configuration forming an inner annular flange, the outer wall having a substantially flat portion for more than half its width from the one sidewall to the other sidewall with the rest of the outer wall adjacent the other sidewall having an outwardly inclined portion from the flat portion, the junction of the inclined portion with the other sidewall being on a point and forming an outer annular flange, the flanges being on opposite sides of the annular groove, the inner annular flange extending outwardly from the ring a greater extent than the outer annular flange, the inner diameter of the ring being smaller than the outer diameter of the base of a ring-receiving groove in the piston, whereby when the ring is seated in the piston groove the ring is distorted so that the inner wall is substantially flattened with the inner annular flange forming a seal with the adjacent corner of the piston groove and the tension placed on the ring by the distortion thereof causes the outer annular flange to extend outwardly into a wiping contact with the inner wall of the cylinder and when pressure is applied to the inwardly extending annular groove in the other sidewall the inner and outer flanges are caused to extend in opposite direction to further seal the surfaces being contacted thereby.

2. The piston seal for a piston and cylinder assembly set forth in claim 1 and wherein at least one annular bearing is positioned on said piston adjacent said piston seal and on the opposite side thereof with respect to said outer annular flange.